July 27, 1954
J. H. LEGGETT ET AL
2,684,819
AIRCRAFT ENGINE SUPPORT STRUCTURE
Filed April 26, 1950
2 Sheets-Sheet 1
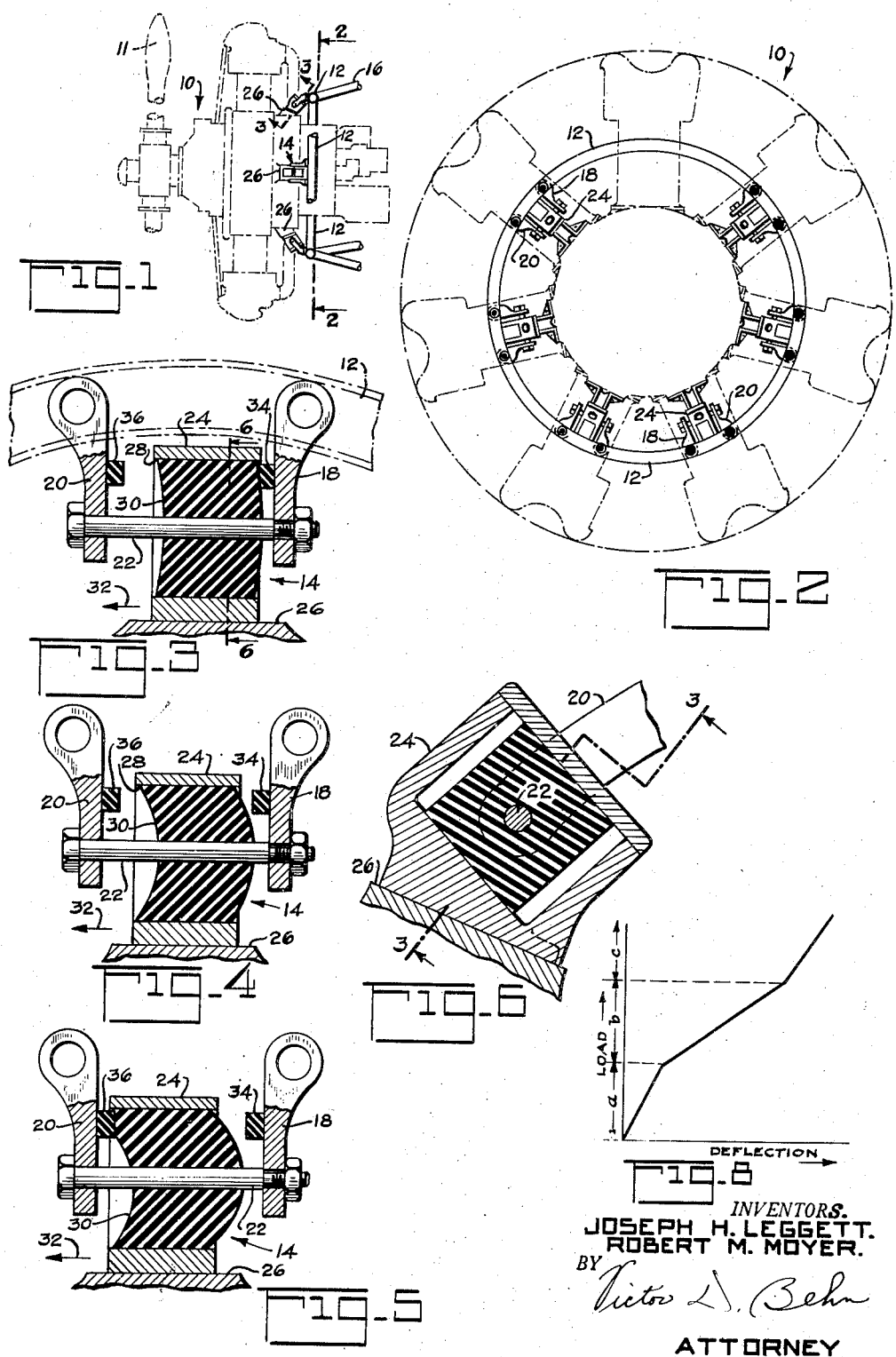
INVENTORS.
JOSEPH H. LEGGETT.
ROBERT M. MOYER.
BY
ATTORNEY July 27, 1954  J. H. LEGGETT ET AL  2,684,819
AIRCRAFT ENGINE SUPPORT STRUCTURE
Filed April 26, 1950                                  2 Sheets-Sheet 2
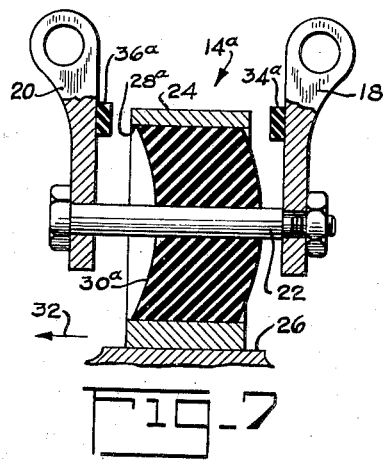
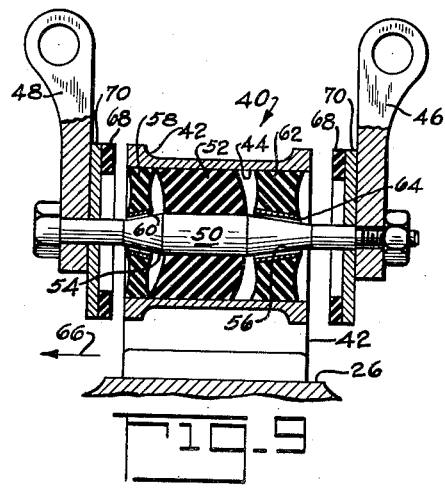
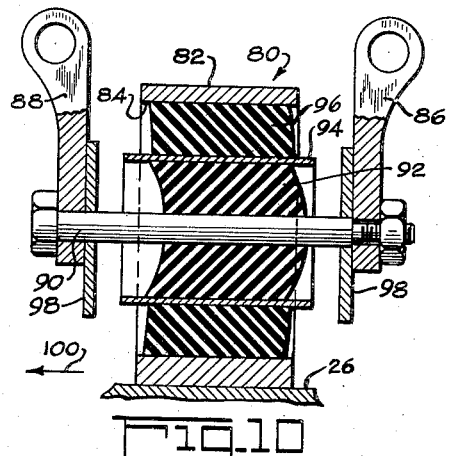
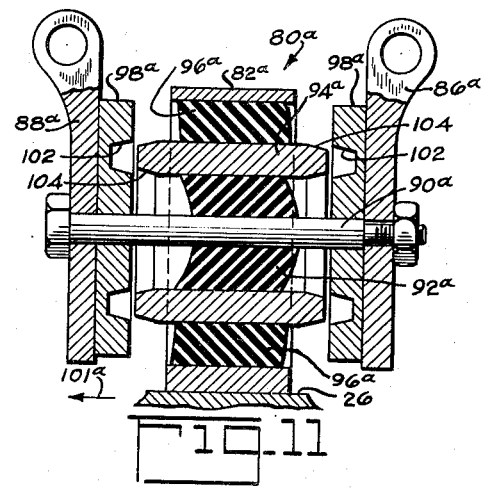
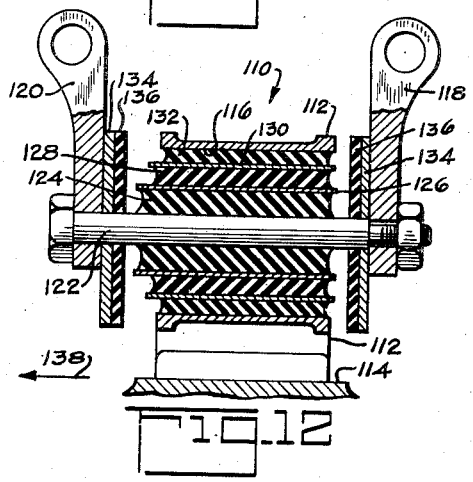
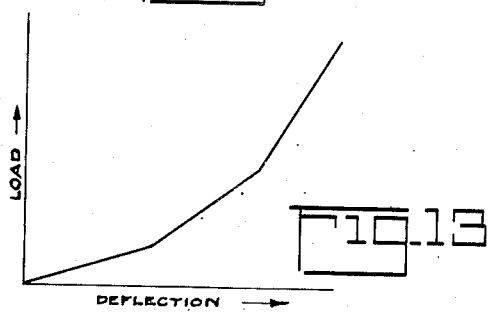
INVENTORS
JOSEPH H. LEGGETT.
ROBERT M. MOYER.
BY Victor A. Behn
ATTORNEY Patented July 27, 1954

2,684,819

UNITED STATES PATENT OFFICE 2,684,819

AIRCRAFT ENGINE SUPPORT STRUCTURE

Joseph H. Leggett, Bloomfield, and Robert M. Moyer, Great Notch, N. J., assignors to Curtiss-Wright Corporation, a corporation of Delaware Application April 26, 1950, Serial No. 158,146

8 Claims. (Cl. 248—5)

This invention relates to resilient engine mounting means and is particularly directed to resilient engine mounting means in which the natural frequency of vibration of the engine on its supporting structure is varied (1) so as to keep said natural frequency out of resonance with the engine vibration exciting forces, (2) to provide good vibration isolation between the engine and its supporting structure at least in the speed range in which the engine is normally operated and/or (3) to provide a resilient engine mount in which the displacement or shift of the engine relative to its supporting structure in response to the engine torque and/or thrust output is not excessive.

In the case of the common four-stroke-cycle internal combustion engine, those forces exciting engine vibration about its torque axis and having a frequency equal to one-half the speed of the engine are the major forces which generally must be considered in designing a resilient engine mount structure so as to avoid resonance of engine vibration with the natural frequency of vibration relative to its supporting structure. These vibration exciting forces, having a frequency equal to one-half the engine speed, are termed one-half order vibration exciting forces. As used in the following description of the invention, resonance of the natural frequency of vibration of the engine about its torque axis relative to the engine supporting structure with the frequency of vibration of engine vibration forces, unless otherwise specified, always refers to said one-half order vibration exciting forces. As will appear, however, the invention is not limited to avoiding resonance of engine vibrations about the engine torque axis nor is it limited to avoiding resonance of engine vibrations caused by exciting forces of one-half order. For example said invention may also be used to avoid resonance of engine vibration exciting forces of other orders and/or to avoid resonance of engine vibrations other than vibrations about the engine torque axis. In a four-stroke-cycle internal combustion engine, the one-half order vibration exciting forces have the lowest frequency of the forces exciting engine vibration about its torque axis so that if a resilient engine mount provides good vibration isolation for said one-half order forces it will also provide good vibration isolation for the higher frequency forces exciting said vibration.

As used herein (specification and claims), unless otherwise specified, by "operating range" of an engine is meant not only its normal operating range, during aircraft flight in the case of an aircraft engine, but is meant the entire range of regular engine operation between its minimum power including idling operation and its maximum power operation. Thus the expression "operating range" does not include transient engine operation between its shut-down condition and idling operation, as when the engine is being started, nor does it include erratic engine operation as when the engine backfires.

Patent No. 2,175,999 to E. S. Taylor discloses a resilient engine mounting arrangement which is in widespread use on aircraft engines. It has been found that in any practical embodiment of said engine mount at least one resonant condition exists in the operating speed range of the engine. That is, with the Taylor engine mounting structure, in at least one engine operating speed the frequency of the engine vibration exciting forces is equal to or in resonance with the natural frequency of vibration of the engine relative to its supporting structure. This prior art engine mount is usually designed so that said resonant condition occurs in the low power or idling portion of its operating range. For example, in an aircraft engine having an idling or low power speed range of 500 to 1300 R. P. M. (revolutions per minute), a cruising speed range of 1400 to 2500 R. P. M. and a speed range of 2600 to 3000 R. P. M. for maximum power, this resonant condition occurs at an engine speed of approximately 1000 R. P. M. This resonant condition at an operating speed of the engine could be avoided by making the engine mount more elastic, that is with a lower spring rate, so that the natural frequency of vibration of the engine relative to its supporting structure is shifted below the frequency of the engine vibration exciting forces at even minimum speed operation of the engine. If, however, the engine mount is provided with such a low spring rate, the range of rotational displacement of the engine about its torque axis relative to the engine supporting structure in response to changes in the engine torque output generally would be so large as to cause a serious engine installation problem.

An object of the present invention comprises the provision of a novel resilient engine mount structure having good vibration isolation characteristics in at least the speed range in which the engine is operated normally or most of the time. A further object of the invention comprises the provision of a novel resilient engine mount structure in which a condition of resonance between the engine vibration exciting forces (torsional and/or translational forces) and the natural frequency of vibration of the engine relative to its supporting structure is avoided at all operating speeds of the engine. A still further object of the invention comprises the provision of a novel resilient engine mount structure in which the range of rotational displacement of the engine about its torque axis in response to changes in the engine torque output is not excessive notwithstanding the fact that at least in the normal operating speed range of the engine the natural frequency of vibration of the engine relative to its supporting structure is well below the frequency of the engine vibration exciting forces.

In any resilient engine mount structure, upon engine operation the engine is rotationally displaced about its torque axis relative to its supporting structure from its zero torque output position by an amount proportional to the torque output of the engine. Furthermore in normal operation of an aircraft engine power plant having a conventional bladed aircraft propeller, the engine torque output has a minimum value in the low speed range of the engine, has an intermediate value in the cruising speed range of the engine and has a maximum value in the high speed range of the engine. Therefore in normal operation of said aircraft engine, the torque responsive displacement of said engine relative to its supporting structure has a minimum value in the low speed range of the engine, has an intermediate value in the cruising speed range of the engine and has a maximum value in the high speed range of the engine. In accordance with the present invention the above objectives are attained by a novel resilient engine mount structure having a variable spring rate, said spring rate being varied in response to displacement of the engine relative to its supporting structure upon changes in the output of the engine.

In most engine installations, the engine is operated normally or most of the time in an intermediate or cruising speed range. In accordance with the present invention, for such an engine installation the resilient engine mount may be designed to have a high spring rate during the low power speed range of the engine, a low spring rate in the cruising speed range of the engine and a high spring rate in the high power speed range of the engine. The arrangement is such that in the low power or idling speed range the natural frequency of vibration of the engine relative to its supporting structure is well above the frequency of the engine vibration exciting forces while during the cruising and the high speed ranges said natural frequency is below the frequency of said vibration exciting forces.

In certain engine installations, however, the engine may be operated most of the time in its low power speed range. In the case of such an engine installation, the resilient engine mount may be designed such that its spring rate is a minimum in this low speed range and such that said spring rate increases as the power output of the engine increases, the natural frequency of vibration of the engine relative to its supporting structure being kept below the frequency of vibration of the engine exciting forces at all operating speeds of the engine.

Other objects of the invention will become apparent upon reading the annexed detailed description in connection with the drawing in which:

Figure 1 is a diagrammatic side view of an aircraft engine and mounting structure therefor;

Figure 2 is a slightly enlarged view taken along line 2—2 of Figure 1;

Figure 3 is an enlarged view taken approximately along line 3—3 of Figure 1 and taken along line 3—3 of Figure 6, said view illustrating one of the resilient engine mount devices when the engine is shut down or operating in its low power speed range;

Figures 4 and 5 are views similar to Figure 3 but illustrating one of the resilent engine mount devices when the engine is operated in its cruising and maximum power speed ranges respectively;

Figure 6 is a sectional view taken along line 6—6 of Figure 3;

Figure 7 is a view similar to Figure 4 but of a slightly modified construction;

Figure 8 is a graph illustrating the variation in the spring rate with changes in the engine torque output load of the resilient engine mount device illustrated in Figures 3 to 7;

Figures 9, 10, 11 and 12 are views similar to Figure 4 but illustrating further modified constructions; and Figure 13 is a graph similar to that of Figure 8 but illustrating the variation in the spring rate with changes in the engine torque load of the resilient engine mount device of Figure 12.

The invention has been designed for use in connection with a resilient mounting means for a radial cylinder aircraft engine. As will appear, however, the invention can be used in connection with resilient mounting means of other engines subject to vibration exciting forces the frequency of which varies with an operating condition of the engine.

As used in the following description, unless otherwise specified, the spring rate of the resilient engine mount devices always refers to the spring rate of said devices as to vibrations or rotational displacements of the engine about its torque axis.

Referring first to Figures 1 to 6 of the drawing, a conventional radial cylinder aircraft power plant is schematically indicated at 10. The power plant 10 has a conventional bladed aircraft propeller 11 and is supported from a ring 12 by means of a plurality of circumferentially spaced resilient devices 14, said ring being connected to the body of the aircraft by struts 16. Each of the resilient engine mount devices 14 includes a U-shaped supporting bracket comprising end arms 18 and 20 and an intermediate arm or bolt 22 connecting said end arms together at one of their ends, the other ends of the arms 18 and 20 being secured to the supporting ring structure 12. In accordance with conventional practice however, each of said U-shaped supporting bracket arms generally has a one-piece construction. Each resilient engine mount device 14 also includes a bracket 24 secured to the engine, the engine being provided with mounting bosses 26 to which the brackets 24 are connected by screws not shown. Each engine bracket 24 has a hollow portion 28 through which the intermediate arm 22 of a supporting structure bracket extends. A rubber bushing 30 is bonded to and about the intermediate arm 22 of each supporting structure bracket and to the walls of the hollow portion 28 of the associated engine bracket 24. The engine mounting structure so far described is conventional and with this conventional structure the bushings 30 provide an elastically yieldable connection between the engine 10 and its supporting structure 12.

Because of the resilience provided by the engine mount devices 14, the engine 10 shifts rotationally about its torque axis relative to the engine supporting structure 12 from its zero torque position to an extent dependent on the magnitude of the engine torque output. The direction of rotation of the engine 10 is assumed to be such that the arrow 32 (Figure 3) indicates the direction of movement of an engine bracket 24 relative to its associated supporting structure bracket in response to an increase in the engine output torque. With the above described engine mount structure, if the spring rate of the engine mount is made constant and sufficiently low that the natural frequency of the engine relative to its supporting structure is below the frequency of the engine vibration exciting forces at even low engine speeds, then the range of rotational displacement of the engine 10 between zero and maximum torque output is excessive. Therefore, in any practical embodiment of said prior art resilient engine mount the spring rate of the engine mount is higher and is such that the engine has a natural frequency of vibration relative to its supporting structure in resonance with the frequency of vibration of the engine exciting forces at some operating speed of the engine.

As already mentioned, in normal operation of an aircraft engine having a conventional bladed aircraft propeller and supported by a resilient engine mount structure, the torque responsive displacement of said engine relative to its supporting structure has a minimum value in the low speed range of said engine, has an intermediate value in the cruising speed range of the engine and has a maximum value in the high speed range of the engine. In accordance with the present invention, the torque responsive shift or displacement of the engine 10 relative to its supporting structure is used for varying the spring rate of the engine mount devices 14 so as to avoid the aforementioned resonant condition of prior art resilient engine mounts and at the same time limit the range of rotational displacement of the engine in response to its torque output to a reasonable value. For this purpose and as illustrated in Figures 3 to 6 in connection with one of the resilient engine mount devices 14, an elastic element 34 of rubber-like material is bonded to each of the arms 18 of the U-shaped supporting structure brackets and a similar elastic member 36 of rubber-like material is bonded to each of the other arms 20 of said supporting structure brackets. Each engine mount device has a similar structure. The arrangement is such that when the engine is shutdown or is operating in its minimum speed and torque range, the position of each engine bracket 24 between its associated supporting structure bracket arms 18 and 20 is such that each rubber element 34 is compressed between its associated rubber bushing 30 and its arm 20 as a result of the stress in said rubber bushing. At this time the rubber elements 36 do not engage the rubber bushings 30 and therefore said elements 36 are inoperative. If the engine speed and torque is increased to its cruising range, then the increase in the torque reaction force on the engine rotationally shifts the engine to such an extent, against the spring forces provided by the rubber bushings 30, that each engine bracket 24 occupies the position illustrated in Figure 4 relative to its supporting structure bracket arms 18 and 20. As illustrated in Figure 4, in the cruising range of the engine neither the rubber elements 34 nor the rubber elements 36 are compressed or engaged by their respective bushings 30 whereby in this range the rubber elements 34 and 36 are both inoperative. If the engine speed and torque is increased to its maximum range, each engine bracket 24 shifts still further relative to its supporting structure bracket arms 18 and 20 in the direction of the arrow 32 to such an extent that each rubber element 36 is now compressed between its rubber bushing 30 and its supporting structure bracket arm 20, as illustrated in Figure 5, the rubber elements 34 remaining inoperative.

Figure 7 illustrates a modification in which a resilient engine mount device 14a is identical to the resilient engine mount device 14 of Figures 3 to 6 except that the rubber elements 34 and 36 of Figures 3 to 6 have been replaced by the rubber elements 34a and 36a. Accordingly all other parts of each of the engine mount devices 14 and 14a are identical and have been indicated by like reference numerals. In Figure 7 each rubber element 34a, like the rubber element 34 of Figures 3 to 6, is mounted on a support bracket arm 18 but each rubber element 34a is arranged to be engaged and compressed by the associated engine bracket 24, instead of by the associated rubber bushing 30, when the engine is shut down or is operating in its minimum speed and torque range. Similarly, in Figure 7 each rubber element 36a is mounted on a support bracket arm 20 and is arranged to be engaged and compressed by the associated engine bracket 24, instead of by the associated rubber bushing 30, in the high speed and torque range of the engine. In the intermediate or cruising speed and torque range of the engine, each rubber element 34a and 36a, like each rubber element 34 and 36, is inoperative in that it is not engaged by its associated engine bracket 24.

The principle of operation of the resilient engine mount structure so far described can more readily be explained in connection with the resilient engine mount structure of Figure 7. With the engine mount structure of Figure 7, during low speed and torque operation, each engine bracket 24 is displaced to the right from the position illustrated so that each rubber element 34a is compressed between its supporting structure bracket arm 18 and its associated engine bracket 24. The rubber elements 36a are inoperative at this time because they do not engage their associated engine brackets 24. Thus during low speed and torque operation of the engine, the rubber element 34a and the associated rubber bushing 30 of each resilient engine mount device 14a operatively connects the engine 10 to its supporting structure 12 such that the rubber bushing 30 and the rubber element 34a of each device 14 act as springs connected in parallel between said engine and said engine supporting structure. The combined or total spring rate of two springs connected in parallel is equal to the sum of the spring rates of the individual springs. Accordingly, in the low speed and torque operating range of the engine, the spring rate of each device 14 is equal to $K1+K2$ where $K1$ is the spring rate of its rubber bushing 30 and $K2$ is the spring rate of its rubber element 34a. During cruising operation each rubber element 34a becomes operatively disconnected from its associated engine bracket 24 as a result of the rotational displacement of the engine about its torque axis because of the increase in the engine torque output, the rubber elements 36a remaining disconnected in this cruising range. Accordingly the rubber elements 34a and 36a are both inoperative in the engine cruising range and the rubber bushings 30 alone act as springs between the engine 10 and its supporting structure 12. Therefore during engine cruising operation the spring rate of each resilient engine mount device 14 is equal to K1, the spring rate of its rubber bushing 30. During high speed and torque operation of the engine the torque responsive shift of the engine is sufficient to bring each engine mount bracket 24 against its associated rubber element 36a to compress said elements. Thus in this high range the rubber element 36a and the rubber bushing 30 of each resilient engine mount 14a are operatively connected in parallel between the engine and the engine supporting structure, the rubber elements 34a remaining inoperative. Accordingly, if the spring rate of each rubber element 36a is K3 then in said high range the total spring rate of each resilient engine mount device 14a is equal to $K1+K3$. At this point it should be noted that the spring rate K2 of each rubber element 34a and the spring rate K3 of each rubber element 36a may or may not be the same.

The above described variation of the spring rate of each resilient engine mount device 14a with rotational displacement of the engine about its torque axis is graphically illustrated in Figure 8. In Figure 8, the engine torque responsive load on each resilient engine mount device 14a is plotted against the deflection or displacement of the associated engine bracket 24 resulting from said load so that the spring rate of said device 14a is proportional to the slope of the resulting curve. As illustrated in Figure 8, in the low torque operating range $a$ of the engine, the spring rate of each device 14a is high $(K1+K2)$ whereby in this range a given increase in said torque load only causes a relatively small increase in the displacement of the associated engine bracket 24. Similarly in the high power operating range $c$ (Figure 8) of the engine the spring rate is also high, said rate being equal to $K1+K3$. In the intermediate or cruising range $b$ (Figure 8) of the engine the spring rate is equal to K1 and therefor is relatively low so that in this intermediate range a given increase in the torque load on each engine bracket 24 produces a relatively large increase in the displacement of said bracket.

Assuming the engine to have an idling and low speed range of 500 to 1300 R. P. M., a cruising speed range of 1400 to 2500 R. P. M. and a maximum or high speed range of 2600 to 3000 R. P. M., the spring rates K1, K2 and K3 may be determined as follows: In the cruising speed range the rubber bushings 30 alone provide a resilient connection between each engine bracket 24 and the associated supporting structure bracket, the rubber elements 34a and 36a being inoperable. The spring rate K1 of each rubber bushing 30 is so chosen that with each engine mount device 14a having a spring rate of K1, resonance of the engine vibration exciting forces with the natural frequency of vibration of the engine mount would exist at the low engine speed of approximately 300 R. P. M., which speed is well below said cruising speed range. In the low speed range of the engine, each rubber element or spring 34a is effective in parallel with its associated rubber bushing 30. The spring rate K2 of each rubber element 34a so chosen, in relation to the spring rate K1, that when said rubber element 34a is in parallel with a rubber bushing 30 the resulting higher spring rate of $K1+K2$ of each engine mount device 14a is such that said resonant condition would exist at an engine speed of at least 1800 R. P. M., which speed is well above said low speed range. Similarly in the high speed range of 2600 to 3000 R. P. M., each rubber element 36a is effectively in parallel with its associated rubber bushing 30 thereby increasing the spring rate of each engine mount device 14a to $K1+K3$ above the cruising spring rate of K1. The spring rate K3 is so chosen, in relation to the spring rate K1, that with each engine mount device 14a having a spring rate of $K1+K3$ said resonant condition would exist at an engine speed of not more than 1800 R. P. M., which speed is well below said high speed range. The numerical values mentioned obviously have only been given by way of example since the invention obviously is not limited thereto.

Only when the natural frequency of vibration of the engine relative to its supporting structure is well below the frequency of the engine vibration exciting forces, is the resilient engine mount structure effective to vibrationally isolate the engine and its supporting structure. The vibration isolation effectiveness of the resilient engine mount increases with increase in the ratio of the frequency of the engine vibration exciting forces to said natural frequency. With the engine mount structure as described, during engine idling and low speed operation said natural frequency is above the frequency of the engine vibration exciting forces so that in this range the resilient engine mount is not effective to vibrationally isolate the engine and its supporting structure. This is not serious however, since, as is usually the case, the engine is operated in the idling and low speed range for only short periods of time and furthermore resonance in said low speed range has been avoided. In the cruising speed range of the engine, the natural frequency of vibration of the engine relative to its supporting structure is well below the frequency of the engine vibration exciting forces. Therefore, in this range in which most engines normally operate, not only has resonance been avoided but the resilient engine mount provides good vibration isolation characteristics between the engine and its supporting structure. In the high speed range the natural frequency of vibration of the engine relative to its supporting structure is raised but said frequency is still well below the now higher frequency of the engine vibration exciting forces so that the engine mount provides good vibration isolation in this high speed range and resonance also does not occur in this range.

The increase in the stiffness or spring rate of the resilient engine mount device in the low and high speed ranges of the engine, as provided by the rubber elements 34a, 36a greatly reduces the range of rotational displacement of the engine about its torque axis relative to its supporting structure as compared to what said range would be if said rubber elements were eliminated. In the absence of the rubber elements 34a and 36a, the rubber bushings 30 would have to be made much stiffer in order to keep said range of rotational displacement of the engine within a reasonable value. Therefore the addition of the rubber elements 34a and 36a makes possible the use of much softer rubber bushings 30 thereby greatly increasing the vibration isolation effectiveness of the resilient engine mount devices in the cruising speed range in which most engines are normally operated.

The resilient engine mount of Figures 3 to 6 has characteristics which are generally similar to the above described characteristic of the resilient engine mount of Figure 7. That is, the resilient engine mount of Figures 3 to 6 has a high spring rate at low speed and torque engine operation, a relatively low spring rate at cruising engine operation and a high spring rate at high speed and torque operation of the engine, in Figures 3 to 6, when engaged by its rubber bushing 30, each rubber element 34 and 36 provides its resilient engine mount device 14 with a spring in parallel with the larger portion of said rubber bushing since each said rubber element is positioned so as to engage its associated rubber bushing adjacent to the associated engine bracket 24. If, however, each rubber element 34 and 36 were disposed adjacent to the intermediate arm 22 of its supporting structure bracket then each said rubber element 34 or 36, when engaged by its associated rubber brushing 30, would provide a spring in parallel with only a small portion of its rubber bushing 30 whereupon the effectiveness of the rubber elements 34 and 36 in increasing the spring rates of their devices 14 would be considerably less.

Obviously, each rubber element 34 and 36 could be bonded to its associated rubber bushing 30 instead of to its respective supporting structure bracket arm. Furthermore if the rubber elements 34 and/or 36 were of the same material as their associated rubber bushings 30 then they could form an integral one-piece structure with their respective rubber bushing 30.

Figures 9 to 11 illustrate modifications of resilient engine mount devices corresponding to the devices 14 and 14a, it being contemplated that in each modification the engine is supported by a plurality of said resilient engine mount devices as illustrated in Figures 1 and 2. As regards rotational displacement of the engine about its torque axis, each of said modified resilient engine mount devices of Figures 9 to 11 has a torque load deflection relationship similar to that illustrated in Figure 8.

Referring now to Figure 9, a resilient engine mount device 40 comprises an engine bracket 42 secured to the mounting bosses 26 of the engine 10 and having a hollow portion 44. The device 40 also comprises a supporting structure bracket having end arms 46 and 48 and an intermediate arm 50 extending through the hollow portion 44 of its associated engine bracket 42, the end arms 46 and 48 being secured to the supporting ring structure 12. A rubber bushing 52 is bonded to and about said intermediate arm 50 and to the wall of the hollow portion 44 of the engine bracket to provide a resilient connection therebetween. The supporting structure bracket arm 50 is provided with two conical portions 54 and 56 disposed on opposite sides of the associated rubber bushing 52 and tapering away from said bushing. An annular rubber element 58 is bonded to the hollow portion 44 of the associated engine bracket 52 to the left (Figure 9) of the rubber bushing 52. The annular rubber element 58 has a metallic conical sleeve 60 secured to its inner surface and adapted to engage the conical portion 54 of the supporting structure bracket arm 50 upon displacement of the engine bracket 42 to the right from its position in Figure 9. A second annular rubber element 62 is bonded to the hollow portion 44 of the associated engine bracket 42 to the right (Figure 9) of the rubber bushing 52. The annular rubber element 62 has a conical sleeve 64 secured to its inner surface and adapted to engage the adjacent conical portion 56 of the supporting structure bracket arm 50 upon displacement of the engine bracket 42 to the left from its position in Figure 9.

When the engine is operating in its cruising range, each engine bracket 42 is positioned, relative to its supporting structure bracket as illustrated in Figure 9 and only the rubber bushing 52 of each device 40 is effective to provide a resilient connection between the engine and its supporting structure. In the low or minimum speed and torque operating range of the engine each engine bracket is displaced to the right by its bushing 52 from its position illustrated in Figure 9 so that its rubber element 58 is also engaged with the associated supporting structure bracket arm 50. Therefore in the minimum speed and torque operating range of the engine, in each resilient engine mount device 40 the rubber element 58 is connected in parallel with the rubber bushing 52 thereby increasing the spring rate of each said device from its value in the cruising speed range. When the engine is operating in its high speed and torque range the engine brackets are displaced to the left, from the position illustrated in Figure 9 and in the direction of the arrow 66, to such an extent as to bring the rubber element 62 into contact with the conical portion 56 of the associated supporting structure bracket arm 50. Thus in said high speed and torque range, the rubber elements 62 are in parallel with their respective rubber bushings 52 to increase the spring rate of each resilient engine mount device over its spring rate in the cruising range of the engine. Accordingly the resilient engine mount device 40 of Figure 9 may be designed, by selection of the spring rates of its rubber members 52, 58 and 62, to have characteristics similar to the resilient engine mount devices 14 and 14a of Figures 3 to 6 and Figure 7, respectively, as to engine vibrations and rotational displacements about its torque axis whereby resonance of said vibrations is avoided and at the same time good vibration isolation is provided as to said vibrations and the rotational displacement of the engine about its torque axis is kept small.

The spring rate of the resilient engine mount devices has been discussed only in connection with vibration and rotational displacement of the engine about its torque axis. In the modifications of Figures 3 to 6, engagement of a rubber element 34 of a resilient engine mount device 14 with the rubber bushing 30 of said device has only little influence on the spring stiffness or rate of said device as to vibrations or displacements perpendicular to its supporting structure bracket arm 22 because of relative sliding between said rubber element and bushing in response to said vibrations or displacements. Similarly each rubber element 36 has only little influence on the spring stiffness or rate of its device 14 in a direction perpendicular to the axis of its supporting structure bracket arm 22. Likewise in the resilient engine mount device of Figure 7, the rubber bushings 34a and 36a have only little influence on the spring stiffness of said device in a direction perpendicular to the axis of their respective supporting structure bracket arms 22.

With the structure of Figure 9, however, each rubber element 58 when engaged with its supporting structure bracket arm 50 is in parallel with its associated rubber bushing 52 between the brackets 42 and 50 as to relative motion of said brackets in all directions thereby increasing the spring stiffness of its engine mount device 40 in all directions. This is because of the conical engaging surfaces between each rubber element 58 and its supporting structure bracket arm 50 whereby there can be no sliding between said surfaces regardless of the direction of the engine vibrations. Similarly each rubber element 62, when engaged by its supporting structure bracket arm 50 is in parallel with its associated rubber bushing 52 as to all directions of relative motion of the brackets 42 and 50 thereby increasing the spring stiffness of its engine mount device 40 in all directions.

Accordingly in Figure 9, the spring rate of each resilient engine mount device 40 varies in a manner similar to that illustrated in Figure 8 not only as to engine vibrations about the engine torque axis but also as to engine vibrations in any transverse direction, that is transverse to the associate supporting structure bracket arm 50. Therefore the resilient engine mount structure of Figure 9 may be designed so that as to engine vibrations and displacements in any direction said structure has characteristics similar to the characteristics of the engine mount devices 14 and 14a as to engine vibrations and displacements about the engine torque axis. Engine vibrations transverse to the axis of the supporting structure bracket arms 50 of Figure 9 may be caused by vibration exciting forces resulting from propeller and/or engine unbalance.

Figure 9 also also illustrates rubber bumpers or stops 68 secured to the supporting structure bracket arms 46 and 48, backing plates 70 being provided between each stop 68 and its supporting structure bracket arm 46 or 48. These bumpers or stops 68 are not engaged by the associated engine bracket 42 in the operating range of the engine and are only provided to form resilient stops to cushion and limit large engine displacements about its torque axis when the engine operation is erratic as for example when the engine backfires. Such stops are conventional and are not the equivalent for example of the rubber elements 34a and 36a of Figure 7 since said elements are designed to be engaged by their engine brackets in the operating range of the engine. The resilient stops or bumpers of the prior art provide resilient limits to engine displacements which limits are outside the range of displacement of the engine between its minimum and maximum torque outputs. Thus the elements 34a of Figure 7 are engaged during low speed engine operation and the elements 36a are engaged during high speed engine operation but the conventional resilient bumpers or stops of the prior art like the stops 68 of Figure 9 are engaged only during erratic engine operation as when the engine backfires.

In the engine mount devices so far described, the increased spring stiffness in the minimum speed and torque range of the engine and in its maximum speed and torque range has been obtained by adding a spring or rubber element in parallel with the rubber bushing of each said device, said bushing alone being operative in the cruising range of the engine. Figure 10 illustrates a modified resilient engine mount device in which two rubber elements in series are operative in the cruising range of the engine but only one of said elements is operative in the minimum speed and torque range of the engine and in the maximum speed and torque range of the engine.

If $Ka$ and $Kb$ are the individual spring rates of two springs, the combined spring rate of said springs connected in series is equal to $$\frac{KaKb}{Ka+Kb}$$

this quantity always being less than the smaller of the two spring rates. Therefore the arrangement of Figure 10 provides a low spring rate in the intermediate or cruising spring rate of the engine when both springs are effective in series and provides a high spring rate in both the minimum speed and torque range of the engine and in the maximum speed and torque range of the engine when only one of said springs is effective. Accordingly, the load-deflection relationship of the resilient engine mount device of Figure 10 is generally similar to that illustrated in Figure 8.

Referring now to Figure 10, a resilient engine mount device 80 comprises an engine bracket 82 secured to a mounting boss 26 of the engine 10, said bracket having a hollow portion 84. In addition each resilient engine mount device 80 comprises a supporting structure bracket having end arms 86 and 88 and an intermediate arm 90 extending through the hollow portion 84 of its associated engine bracket 82, the end arms 86 and 88 being secured to the supporting ring structure 12. A rubber bushing 92 is bonded to and about said intermediate arm 90 and an annular metallic sleeve 94 is bonded to and about said bushing. A second rubber bushing 96 is bonded to and about the sleeve 94 and to the hollow interior of the engine bracket 84. Preferably the bushing 92 has a lower spring rate than the bushing 96.

In Figure 10, the resilient engine mount device 80 is illustrated in its condition during cruising operation of the engine. In this condition, the rubber bushings 92 and 96 of each engine mount device 80 in effect are connected in series between its engine bracket 82 and its supporting bracket structure. In the low speed and torque operating range of the engine, each rubber bushing 92 displaces its engine bracket 84 from the position illustrated in Figure 10 to a position in which the associated metallic sleeve 94 engages a plate 98 on the associated supporting structure bracket arm 86. In this condition of each resilient engine mount device 80, its rubber bushing 92 is ineffective as to vibrations of the engine about its torque axis so that only the spring or rubber bushing 96 is effective. In the high speed and torque range of the engine, the engine bracket 82 of each resilient engine mount device 80 is displaced to the left in the direction of the arrow 100, by the increased torque reaction force, to such an extent that the metallic sleeve 94 of said device engages a plate 98 on the supporting structure bracket arm 88. Accordingly the rubber bushing 92 is also ineffective in the high speed range of the engine.

With the structure of Figure 10, when the sleeve 94 of each resilient engine mount device 80 engages either of the plates 98 on a supporting structure bracket arm 86 or 88 the spring or rubber bushing 92 is ineffective whereupon the spring rate of said resilient engine mount device is increased above its spring rate when the sleeve 94 is spaced from both said plates. However, this engagement of the sleeve 94 with one of the plates 98 has only little effect on the spring rate of its resilient engine mount device as to vibrations directed transversely relative to the axis of the associated supporting structure bracket arm 90.

Figure 11 illustrates a resilient engine mount device similar to that of Figure 10 so that the parts of Figure 11 have been designated by the same reference numerals as the corresponding parts of Figure 10 but with a subscript $a$ added thereto. The resilient engine mount device 80$a$ of Figure 11 is like the resilient engine mount device 80 of Figure 10 except an inwardly tapering annular groove 102 is formed in each plate 98$a$ and the annular sleeve 94$a$ is provided with tapering ends 104 receivable in said grooves 102. With this arrangement of Figure 11, when the sleeve 94$a$ abuts either of the plates 98$a$ not only is the stiffness of the engine mount device 80$a$ increased as to engine vibrations about its torque axis but because one end 104 of the sleeve 94$a$ is received within a groove 102 of the adjacent plate 98$a$, the stiffness of each engine mount device 80$a$ is also increased as to engine vibrations directed transversely relative to its supporting structure bracket arm 90$a$.

All the resilient engine mount devices so far described have a load-deflection relationship which is generally similar to that illustrated in Figure 8 whereby said devices have a high spring rate in both the minimum and maximum speed ranges of the engine and have a relatively low spring rate in the intermediate or cruising speed range of said engine. Such an engine mount device provides good vibration isolation in the engine cruising speed range in which most engines are operated normally or most of the time. If, however, an engine were operated most of the time in its low speed range then the engine mount devices so far described would not provide good vibration isolation in said range. Figure 12 illustrates a resilient engine mount device providing good vibration isolation in the low speed range of the engine and therefore said engine mount device is particularly suitable for use in an engine which is operated most of the time in said low speed range.

In Figure 12, a resilient engine mount device 110 comprises an engine bracket 112 secured to an engine 114, said bracket having a hollow portion 116. Each device 110 also comprises a supporting structure bracket having end arms 118 and 120 and an intermediate arm 122 extending through the hollow portion 116 of its associated engine bracket 112, said end arms being secured to a supporting ring structure as in the other modifications. A first rubber bushing 124 is bonded to and about said intermediate arm 122. A first annular metallic sleeve 126 is disposed about and is bonded to said rubber bushing 124. A second rubber bushing 128 is disposed about and is bonded to said first sleeve 126. A second annular metallic sleeve 130 is disposed about and is bonded to said second rubber bushing 128. A third rubber bushing 132 is disposed about and is bonded to said second sleeve, said third rubber bushing also being bonded to the interior surface of the hollow portion 116 of the associated engine bracket 112. Each supporting structure bracket end arm 118 and 120 has a backing plate 134 secured thereto and a resilient bumper 136. The bumpers 136 are quite stiff and provide stops limiting displacement of the associated engine bracket 112 during erratic engine operation as when the engine backfires, said bumpers not being engaged by the associated engine bracket 112 in the operating speed and torque range of the engine. Preferably the relative stiffness of the rubber bushings 124, 128 and 132 is such that the rubber bushing 124 is the softest and the rubber bushing 132 is the most stiff.

In Figure 12, the resilient engine mount device 110 is illustrated in its condition when the engine is operating in its low speed range. In this condition, the rubber bushings 124, 128 and 132 of each resilient engine mount device 110 comprise three springs in series between their engine bracket 112 and the associated supporting structure bracket. When the engine speed and torque output is increased to its cruising range, the increase in the torque reaction force in the direction of the arrow 138 shifts each engine bracket 112 to such an extent relative to its associated supporting structure bracket that the sleeve 126 of each device 110 engages the bumper 136 of its supporting structure bracket arm 120. This engagement of each sleeve 126 with its supporting structure bracket arm 120 renders the rubber bushings 124 ineffective as to vibration of the engine about its torque axis so that as to such vibrations only the rubber bushings 128 and 132 of each device 110 are in series between the engine and its supporting structure. This elimination of each rubber bushing 124 results in an increase in the stiffness or spring rate of each engine mount device 110. If the spring and torque output of the engine is further increased to its maximum range then each engine bracket 112 shifts still further to the left, relative to its supporting bracket structure, to such an extent that each sleeve 130 also engages the supporting structure bracket arm 120. Accordingly in the high speed and torque range of the engine only the rubber bushing 132 of each device 110 is effectively connected between the engine and its supporting structure whereby the spring rate of each said device is further increased.

Figure 13 graphically illustrates the relationship between the torque load on an engine bracket 112 of an engine mount device 110 and the deflection or displacement of said bracket relative to its associated bracket structure. The slope of said curve indicates the increase in stiffness of the spring rate of each device 110 with increase in torque load. In the low speed range of the engine the resilient engine mount device 110 has a sufficiently low spring rate that resonance of the engine vibration exciting forces with the natural frequency of vibration of the engine would occur at a speed not greater than approximately 300 R. P. M., which speed is well below said low speed range. Accordingly the resilient engine mount device 110 provides good vibration isolation in said low speed range. In the higher speed ranges the spring stiffness of each resilient engine mount device 110 is also higher but in each of the higher speed ranges said resonance would occur at an engine speed well below said range. For example in the cruising speed range the spring stiffness of the engine mount device 110 may be designed so that said resonance would occur at a speed not greater than approximately 1000 R. P. M. and in the maximum speed range said resonance would occur at a speed not greater than 1800 R. P. M. This increase in stiffness or spring rate of each resilient engine mount device 110 with increase in the speed and torque of the engine prevents the range of rotational displacement of the engine about its torque axis from being excessive and at the same time the resilient engine mount provides good vibration isolation in the entire engine speed ranges. In each device 110, if desired one of the rubber bushings 124, 128 or 132 could be eliminated or additional rubber bushings could be added to decrease or increase respectively the number of steps in the spring rate of each said device.

In the case of an aircraft engine drivably connected to a bladed aircraft propeller, in normal engine operation the thrust output of the engine is a minimum in the low speed range of the engine, is an intermediate value in the cruising speed range of the engine and is a maximum in the high speed range of the engine. Accordingly the displacement, parallel to the engine torque axis, of the engine brackets of each resilient engine mount device relative to its supporting structure bracket from its position when the engine is shut down is a minimum in the low speed range of the engine, is an intermediate value in the cruising speed range of the engine and is a maximum in the high speed range of the engine. Accordingly, instead of using rotational displacements of the engine it is possible to use the axial displacements of the engine for varying the spring rate of the resilient engine mount devices. In a radial cylinder engine such as illustrated in Figures 1 and 2, the center of gravity of the engine is a substantial distance forward of the plane of the resilient engine mount devices so that said devices are made quite stiff against axial displacement of the engine. Therefore with the engine supported as in Figures 1 and 2, the use of axial displacement of the engine to vary the spring rate of the resilient engine mount device is not practical. If the engine is supported by resilient engine mount devices disposed both fore and aft of the engine center of gravity, as is common in the case of in-line engines, then said devices may be made relatively soft as to axial engine displacements. In such a case changes in the axial displacement of the engine relative to its supporting structure as a result of variations in the axial thrust output of the engine could be used for varying the spring rate of the resilient engine mount device. For example such an engine could be supported by resilient engine mount devices similar to the device 40 illustrated in Figure 9 with each supporting structure bracket arm 50 disposed parallel to the engine axis. With this arrangement the axial displacement of the engine in response to variations in its axial thrust would vary the spring rate of the resilient engine mount device 40 just as previously described, in connection with Figure 9, in response to displacement of the engine about its torque axis.

All of the resilient engine mount devices described comprise a plurality of springs each constituting a member of rubber-like material. Obviously said members need not be made of natural rubber. Accordingly as used herein, by "rubber" or "rubber-like" material it is intended to include natural rubber as well as other elastomeric materials, as for example the so-called synthetic and silicone rubbers. Furthermore instead of springs or elastic means of rubber-like material it is obvious that other elastic means, as for example metallic springs, could be used.

The dimensions of the brackets and rubber members of each resilient engine mount device are such that the transition from one spring rate to another preferably occurs at an engine speed at which the engine is not operated for any appreciable length of time. For example in Figure 7, the dimensions of the brackets and rubber members of each device 14a are such that each rubber element 34a engages or disengages its associated engine bracket 24 between the low power and idling range of the engine and its cruising range and each rubber element 36a engages or disengages its associated engine bracket 24 between the cruising range of the engine and its maximum power range. Thus the rubber elements 34a and 36a engage or disengage their respective engine brackets between the normal operating ranges of the engine whereby the engine is not operated for any appreciable length of time at a condition in which the rubber elements 34a or 36a are about to engage or disengage their respective engine brackets 24.

Numerous resilient engine mount devices of different physical structure have been illustrated and described. In all of said devices, however, the spring rate of the engine mount device varies with the displacement of the engine in response to changes in an engine operating condition, as for example engine torque and/or thrust output. In addition the variation in said spring rate is such as to keep the natural frequency of engine vibration out of resonance with engine vibration exciting forces and at the same time good vibration isolation is provided and the displacement of the engine relative to its supporting structure is kept small.

While we have described our invention in detail in its present preferred embodiments, it will be obvious to those skilled in the art, after understanding our invention, that various additional changes and modifications may be made therein without departing from the spirit or scope thereof. We aim in the appended claims to cover all such modifications.

We claim as our invention:

1. A device for resiliently connecting an engine to a supporting structure; said device comprising a bracket for connection to an engine; a bracket for connection to a supporting structure, one of said brackets having a hollow part and the other of said brackets having an arm part extending into said hollow part; a first member of rubber-like material bonded to a surface of said hollow part and to a surface of said arm part; and a second member of rubber-like material bonded to a surface of one of said parts, the other of said parts having a conical surface portion and said second member having a portion disposed adjacent to said conical surface portion for engagement with and disengagement from said conical surface portion in response to relative movements of said brackets along the axis of said conical surface portion.

2. A device for resiliently connecting an engine to a supporting structure; said device comprising a bracket for connection to an engine; a bracket for connection to a supporting structure, one of said brackets having a hollow part and the other of said brackets having an arm part extending into said hollow part; a first member of rubber-like material bonded to a surface of said hollow part and to a surface of said arm part; a second member of rubber-like material bonded to a surface of one of said parts, the other of said parts having a first conical surface portion and said second member having a portion disposed adjacent to said conical surface for engagement with and disengagement from said conical surface portion in response to relative movements of said brackets along the axis of said conical surface portion; and a third member of rubber-like material bonded to a surface of one of said parts, the other of said parts having a second conical surface portion and said third member having a portion disposed adjacent to said second conical surface portion for engagement with and disengagement from said second conical surface portion in response to relative movements of said brackets along said axis, said first and second conical surface portions being co-axial and oppositely directed.

3. A device for resiliently connecting an engine to a supporting structure such that the engine shifts about its torque axis relative to said supporting structure in response to changes in the torque output of the engine; said device comprising a bracket for connection to an engine; a bracket for connection to a supporting structure; and means elastically connecting said brackets in such a manner that the spring rate of said connection in the direction of the relative shift of said brackets in response to changes in engine torque depends on the relative position of said brackets along a line parallel to said direction; said means including a member having a first portion connected to one of said brackets, the other of said brackets having an engageable portion and said member having a second portion engageable with and disengageable from said engageable bracket portion for varying said spring rate, said member second portion being disposed in engagement with said engageable bracket portion when the engine torque responsive shift of the bracket is below a predetermined value and being movable out from engagement with said engageable bracket portion when the engine torque responsive shift of the brackets exceeds said value.

4. A device for resiliently connecting an engine to a supporting structure such that the engine shifts about its torque axis relative to said supporting structure in response to changes in the torque output of the engine; said device comprising a bracket for connection to an engine; a bracket for connection to a supporting structure; and means elastically connecting said brackets in such a manner that the spring rate of said connection in the direction of the relative shift of said brackets in response to changes in engine torque output depends on the relative position of said brackets along a line parallel to said direction; said means comprising a first member of rubber-like material having a first portion secured to one of said brackets and having a second portion secured to the other of said brackets, and a second member of rubber-like material having a first portion secured to one of said brackets, the other of said brackets having an engageable portion and said second member having a second portion engageable with and disengageable from said engageable bracket portion for varying said spring rate, said second member second portion being disposed in engagement with said engageable bracket portion when the engine torque responsive shift of the brackets is below a predetermined value and being movable out from engagement with said engageable bracket portion when the engine torque responsive shift of the brackets exceeds said value.

5. A device for resiliently connecting an engine to a supporting structure such that the engine shifts about its torque axis relative to said supporting structure in response to changes in the torque output of the engine; said device comprising a bracket for connection to an engine; a bracket for connection to a supporting structure; and means elastically connecting said brackets in such a manner that the spring rate of said connection depends on the relative position of said brackets along a line parallel to the direction of shift of said brackets in response to changes in engine torque output; said means comprising a first member of rubber-like material having a first portion secured to one of said brackets and having a second portion secured to the other of said brackets, and a second member having a first portion secured to one of said brackets, the other of said brackets having a surface portion and said second member having a complementary surface portion engageable with and disengageable from said bracket surface portion for varying said spring rate, one of said surface portions comprising a recess into which the other surface portion is arranged to extend for engagement therewith, said second member surface portion being disposed in engagement with said bracket surface portion when the engine torque responsive shift of said brackets is below a predetermined value and being movable out from engagement with said bracket surface portion when the engine torque responsive shift of the brackets exceeds said value.

6. A device as recited in claim 3 in which said elastic connecting means also includes a first rubber-like element connecting said member first portion to one of said brackets and a second rubber-like element connecting said member first portion to the other of said brackets and in which said member is relatively rigid compared with said rubber-like elements.

7. A device as recited in claim 3 in which one of said brackets has a hollow part and the other of said brackets has an arm extending into said hollow part and said member is annular and is disposed within said hollow part about said arm with said member first portion being disposed between the ends of said member and in which said elastic connecting means also includes a first annular rubber-like element disposed between and connecting said member first portion to said bracket arm and a second annular rubber-like element disposed between and connecting said member first portion to said hollow bracket part.

8. A device as recited in claim 7 in which said other bracket engageable portion has an annular groove within which said member second portion is engageable.

References Cited in the file of this patent
UNITED STATES PATENTS

| Number | Name | Date |
| --- | --- | --- |
| Re. 21,328 | Stitz | Jan. 16, 1940 |
| 2,070,782 | Canney | Feb. 16, 1937 |
| 2,126,707 | Schmidt | Aug. 16, 1938 |
| 2,175,999 | Taylor | Oct. 10, 1939 |
| 2,324,997 | Brown | July 20, 1943 |
| 2,351,427 | Henshaw | June 13, 1944 |
| 2,368,334 | Tyler | Jan. 30, 1945 |
| 2,383,645 | Hahn | Aug. 28, 1945 |
| 2,411,562 | Thompson | Nov. 26, 1946 |
| 2,415,280 | Fink | Feb. 4, 1947 |
| 2,457,340 | Berry | Dec. 28, 1948 |
| 2,468,900 | Thiry | May 3, 1949 |
| 2,472,029 | Thiry | May 31, 1949 |
| 2,490,492 | Tyler | Dec. 6, 1949 |
| 2,541,566 | Applegate | Feb. 13, 1951 |